Sept. 30, 1958     W. EXTON, JR     2,853,803
EMPLOYEE BENEFITS EDUCATIONAL DEVICE
Filed Aug. 9, 1954
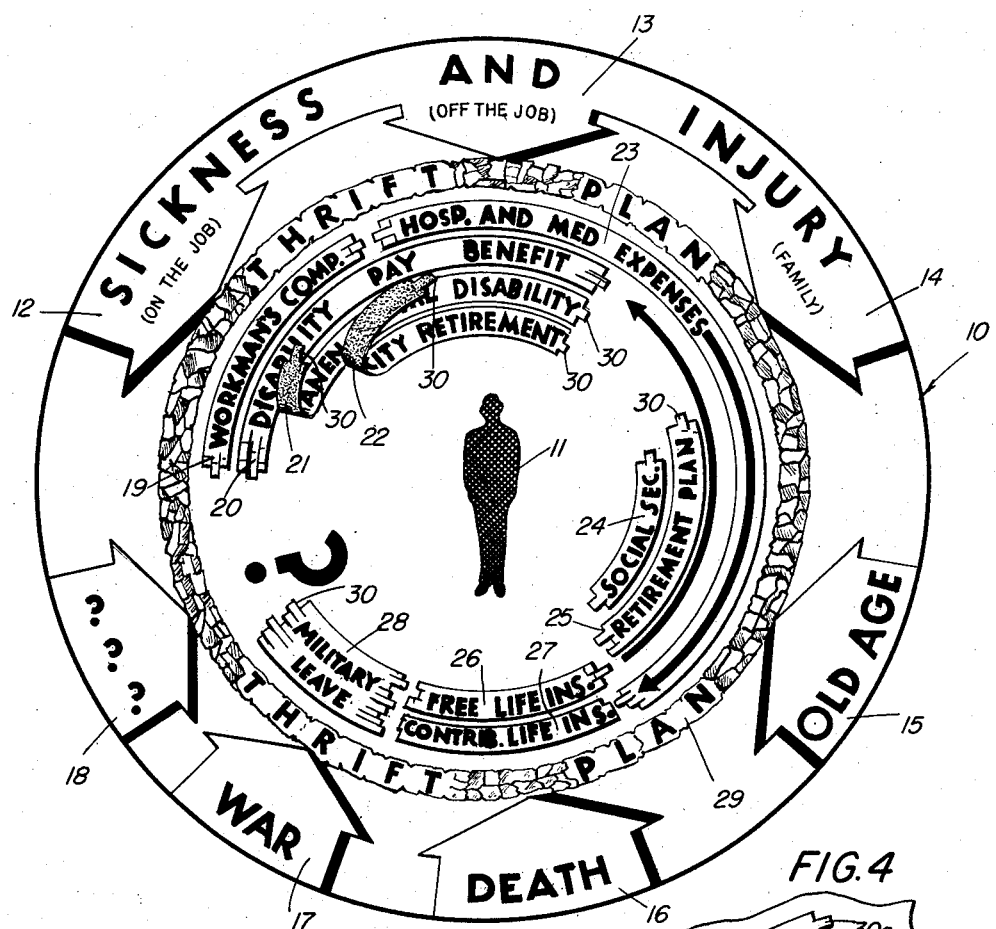
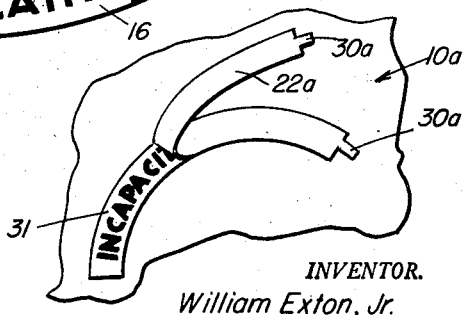
INVENTOR.
William Exton, Jr.
BY
Churchill, Rich, Weymouth & Engel
Attorneys United States Patent Office 2,853,803
Patented Sept. 30, 1958

2,853,803
EMPLOYEE BENEFITS EDUCATIONAL DEVICE

William Exton, Jr., New York, N. Y., assignor to William Exton, Jr., & Associates, Inc., Dover Plains, N. Y., a corporation of New York Application August 9, 1954, Serial No. 448,425

4 Claims. (Cl. 35—24)

This invention relates to an educational device, and more particularly to means for demonstrating in graphical and attention-compelling manner certain facts during the course of an audio-visual presentation.

Explanation of an idea or of facts may be presented orally in the form of a lecture or talk in which reference is made to a graphical representation or chart. Such presentation is particularly advantageous where the explanation is given to a group having a common interest. However, a graphical representation or chart, if displayed in completed form, has many facts and relationships shown upon it which may cause confusion or be liable to misinterpretation by members of the group before explanation has been given. Furthermore, the significance of such facts and relationships may be lost to members of the group through interruption, lapses of attention or fatigue during the oral presentation. There is little which is attention-compelling or dramatic about any static chart which remains in full view of a group of listeners during the entire period required for explanation of its several parts.

The present invention provides an educational device in the form of a chart in combination with separate attachments therefor whereby facts may be successively and dramatically presented thereon as a related lecture or talk progresses. The separate attachments may be applied to the chart at the respective proper times by known or convenient means, as by pressure-sensitive or other type of adhesive. Thus the device is not static, cannot be misinterpreted or become commonplace before its several parts have been explained, and its significance is graphically and dramatically presented sequentially as the explanation proceeds.

Although the invention may be employed in many connections, it is illustrated in its embodiment in a device for educating employees of a large corporation with respect to the numerous and varied benefits to which they are entitled under company policy. In the accompanying drawings, Fig. 1 shows the device including the chart and the separate attachments adhering or partly adhering thereto;

Fig. 2 shows one of the separate attachments;

Fig. 3 shows another separate attachment; and

Fig. 4 is a fragmental view of a variant form of chart with a variant form of attachment partly adhering thereto.

In the embodiment illustrated in Fig. 1, there is shown a chart 10 upon which are permanently represented the employee 11 in the center of the chart and, spaced therefrom, certain hazards which the employee must face, disposed about the periphery of the chart and pointing inwardly toward the employee. Thus, at the top of the chart, extending inwardly from a legend reading "SICKNESS AND INJURY" an arrow 12 labeled "(On the job)," an arrow 13 labeled "(Off the job)," and an arrow 14 labeled "(Family)" all point inwardly toward the employee 11. Continuing clockwise about the chart, a further arrow 15 bearing the legend "OLD AGE," another arrow 16 bearing the legend "DEATH," still another arrow 17 bearing the legend "WAR," and a final arrow 18 bearing three question marks all point toward the employee 11. These are the hazards which the employee must face. It may be mentioned here that the final arrow 18 represents such individually variable expenses as education of children, travel, purchase of a home, or the like.

Accordingly, the chart has permanently represented thereon at least two indications, here the employee 11 and any one of the arrows 12 to 18 inclusive, one of which (the arrow) affects the other (the employee). The representation brings home to the observer the hazards to which he himself, the central figure, is subject.

Starting with the chart in the condition so far described, the lecturer explains what protection the policy of the company places between the employee 11 and each hazard. As the lecturer mentions each item of protection, he fixes to the chart, between the employee 11 and the designated hazard, a separate attachment bearing the name of the protection. He then explains this item. Thus, each element of protection is dramatized in attention-compelling manner to the group which hears the lecture or talk at the time when that element is described.

Accordingly, an arcuate separate attachment 19 labeled "WORKMAN'S COMP." is fixed to the chart between the employee 11 and the arrow 12 which extends from the legend "SICKNESS AND INJURY" and is labeled "(On the job)." The lecturer then explains how Workman's Compensation stands between the employee and the results of sickness and injury on the job, and how, under the law, the company pays this compensation.

The lecturer next explains how disability pay benefits, paid under the company plan, stand between the employee and sickness or injury both on or off the job, first fixing in appropriate position upon the chart an arcuate separate attachment 20 labeled "DISABILITY PAY BENEFIT." As the explanation proceeds, other separate attachments 21 to 28, suitably labeled, are fixed in appropriate positions on the chart immediately preceding the particular description of the benefit which each represents.

Finally, a separate attachment 29 labeled "THRIFT PLAN," and represented as a circular stone wall, is fixed to the chart to surround the employee 11 and all of the other separate attachments, but inside of the arrows 12 to 18, inclusive. The company thrift plan is then explained, as is its function of augmenting any other benefits when desirable. The separate attachment 29 may be of unbroken circular form or may be formed segmentally, according to convenience.

The separate attachments 21 and 22 are shown in Fig. 1 as being but partly applied to the chart 10, and their outwardly turned backs are indicated as coated with an adhesive, which is preferably of the reusable type. Accordingly, the attachments may be peeled from the chart preparatory to another lecture. At each end of each separate attachment an uncoated tab 30 is provided which, of course, will not adhere to the chart. The tabs 30 are preferably continuations of the material of the separate attachment to which no adhesive or gum is applied. Such tabs are best illustrated in Figs. 2 and 3.

Instead of placing upon the chart a separate attachment bearing the name of each item of protection, it may be preferred to print the names of such items in arcuate correct positions directly upon the chart, and to mask such printing until it is to be mentioned in the lecture. Such alternative arrangement is shown in Fig. 4. Here the wording which appears upon the separate attachment 22 in the embodiment heretofore described is now printed upon the chart 10a itself, as at 31. A plain separate attachment 22a, similar in all respects to the separate attachment 22 except that no printing appears thereon, is fixed to the chart to mask the printing appearing at 31. As the lecturer starts to discuss the item of protection appearing at 31, he grasps a tab 30a at one end of the plain separate attachment 22a and peels this masking member from the chart, thereby revealing the item printed at 31. The lecture or talk then proceeds as heretofore described, the separate attachments being peeled from instead of fixed to the chart.

From the foregoing, it will be evident that the combination of fixed chart and separate attachments provides an attention-compelling educational device whereby the subject of a lecture may be dramatized in a most effective manner as the description proceeds. The possibility of misinterpretation or of flagging attention due to interruption, mind-wandering, or fatigue is minimized, and up-to-the-instant following of the explanation is facilitated.

The forms of the invention here described and illustrated are selected as examples of the application of the invention. Educational devices employing the present invention for other purposes will, of course, be quite obvious as a result of the foregoing explanation. It is, therefore, to be understood that the language and illustrations presented herein are not limitations of the invention as hereinafter claimed.

What is claimed is:

1. A device for use in connection with an oral presentation of benefits afforded to an individual under various plans to provide him with protection against various hazards and adapted to visually develop the explanation of the benefits on a point-by-point basis comprising, a chart having centrally represented thereon a figure denoting the individual to be protected and a plurality of indicia pointing toward said figure representing said hazards, circularly arranged about said figure in spaced relation thereto and to each other, thus providing an annular space between said figure and said indicia, and a plurality of separate arcuate attachments coated with pressure-sensitive adhesive and adapted to be repeatedly adhesively and removably affixed to said chart in said annular space between said figure and said indicia of hazards to reveal to the auditor the characteristics of said benefits as they are explained orally by manipulation of said attachments, whereby each benefit may be illustrated on said chart only when a description of it is reached in the oral presentation.

2. A device according to claim 1 wherein the names of said benefits are printed on said chart and said arcuate attachments are masks which cover said names until manually removed.

3. A device according to claim 1 wherein the names of said benefits are printed on said arcuate attachments and are revealed upon their adhesive application to the chart within said annular space.

4. A device for use in connection with an oral presentation of benefits afforded to an individual under various plans to provide him with protection against various hazards and adapted to visually develop the explanation of the benefits on a point-by-point basis comprising, a chart having centrally represented thereon a figure denoting the individual to be protected and a plurality of indicia pointing toward said figure representing said hazards, circularly arranged about said figure in spaced relation thereto and to each other, thus providing an annular space between said figure and said indicia, and a plurality of separate arcuate attachments, cooperating means on said attachments and said chart for removably affixing said attachments to said chart in said annular space between said figure and said indicia of hazards to reveal to the auditor the characteristics of said benefits as they are explained orally by manipulation of said attachments, whereby each benefit may be illustrated on said chart only when a description of it is reached in the oral presentation.

References Cited in the file of this patent

UNITED STATES PATENTS

| | | |
|---|---|---|
| 666,999 | Borden | Jan. 29, 1901 |
| 1,200,348 | Hawk | Oct. 3, 1916 |
| 1,772,697 | Beckmyer | Aug. 12, 1930 |
| 1,926,553 | Morse | Sept. 12, 1933 |
| 2,511,953 | Tallman | June 20, 1950 |